Feb. 11, 1930.  G. B. COLLIER  1,746,418
VALVE MECHANISM FOR INTERNAL COMBUSTION MOTORS
Filed Dec. 2, 1925   6 Sheets-Sheet 3

Inventor
Guy B. Collier
by his attorneys

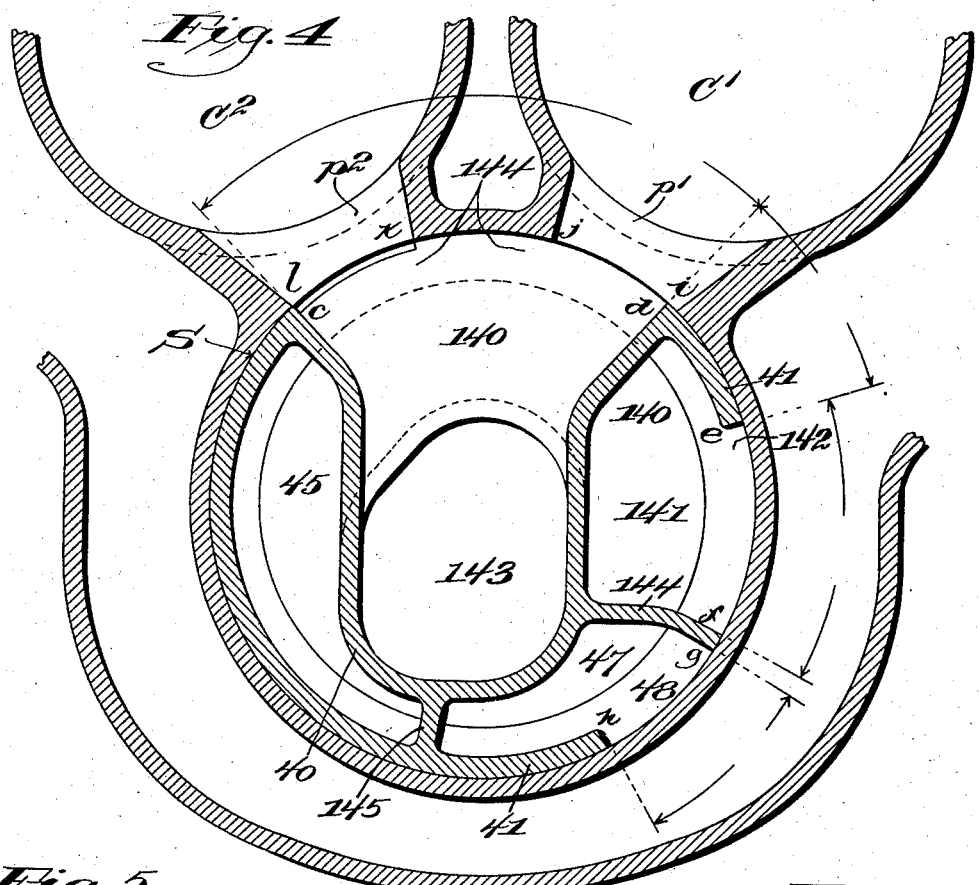
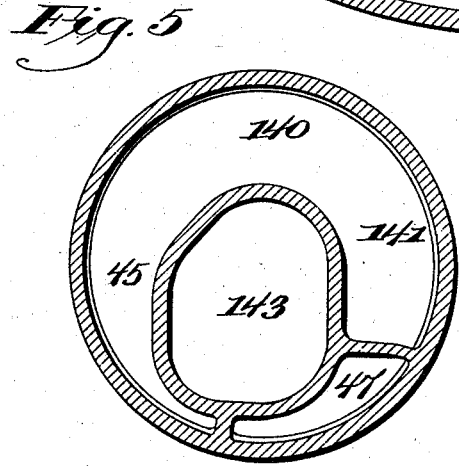
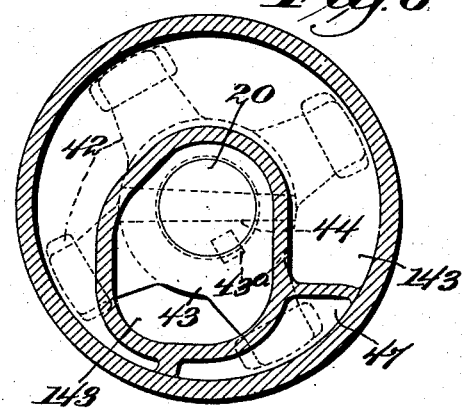

Feb. 11, 1930.   G. B. COLLIER   1,746,418
VALVE MECHANISM FOR INTERNAL COMBUSTION MOTORS
Filed Dec. 2, 1925   6 Sheets-Sheet 5

Inventor
Guy B. Collier

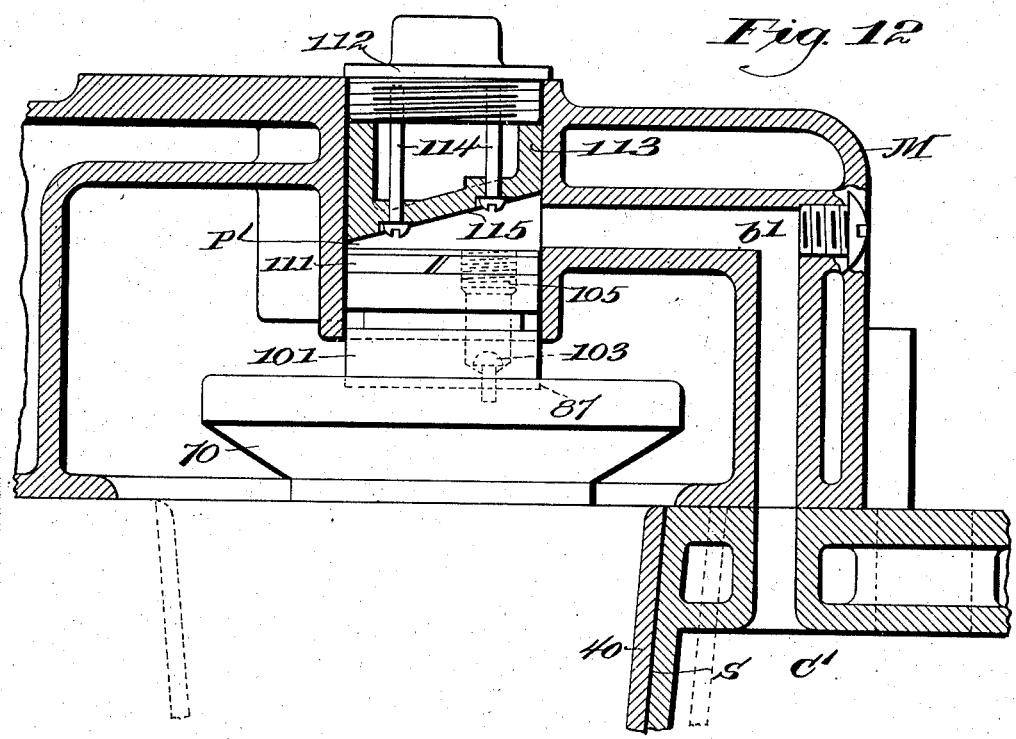
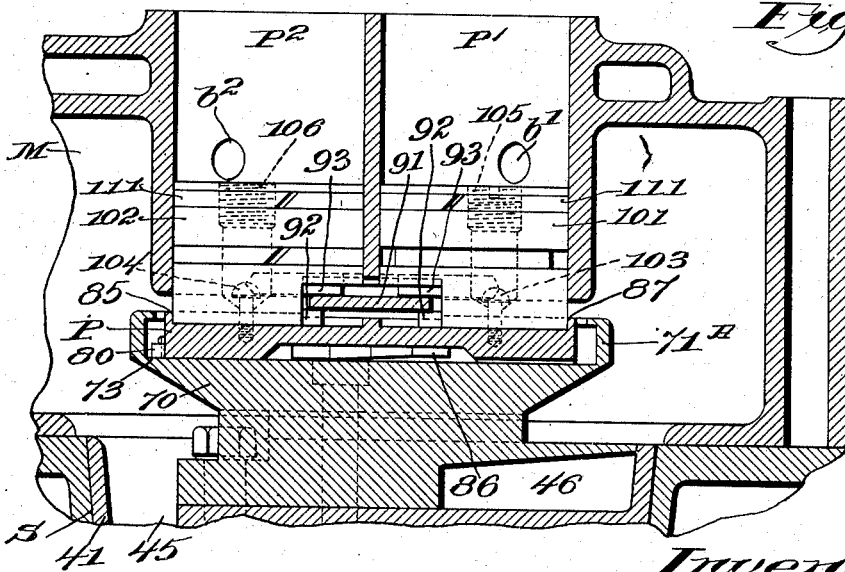

Patented Feb. 11, 1930

1,746,418

UNITED STATES PATENT OFFICE

GUY B. COLLIER, OF KINDERHOOK, NEW YORK

VALVE MECHANISM FOR INTERNAL-COMBUSTION MOTORS

Application filed December 2, 1925. Serial No. 72,654.

The present invention relates to improvements in internal combustion motors and more particularly to improvements in the rotary valve mechanism embodied in such motors.

The features of the present invention are shown as embodied in valve mechanism of the general type disclosed in my prior Patent, No. 1,040,277, dated October 8, 1912. According to the present invention the heat from the exhaust gases passing through the valve is utilized for the purpose of heating and preventing condensation of relatively cool incoming gases passing to the motor from the carbureter. Not only are the incoming gases heated from the exhaust, but in addition the incoming gases are passed about the exhaust gas passage in such a manner as to substantially completely insulate it from the outer wall or shell of the valve. In this manner overheating and undue expansion of the rotary valve are prevented, and problems incident to such heating of the valve are in great measure avoided. In addition to the above described features, the present invention contemplates certain other novel features, construction, and combination of parts all contributing to a more efficient valve construction, the advantages of which will be more fully described hereinafter.

In the accompanying drawings illustrating the preferred form of the invention,

Figure 1:
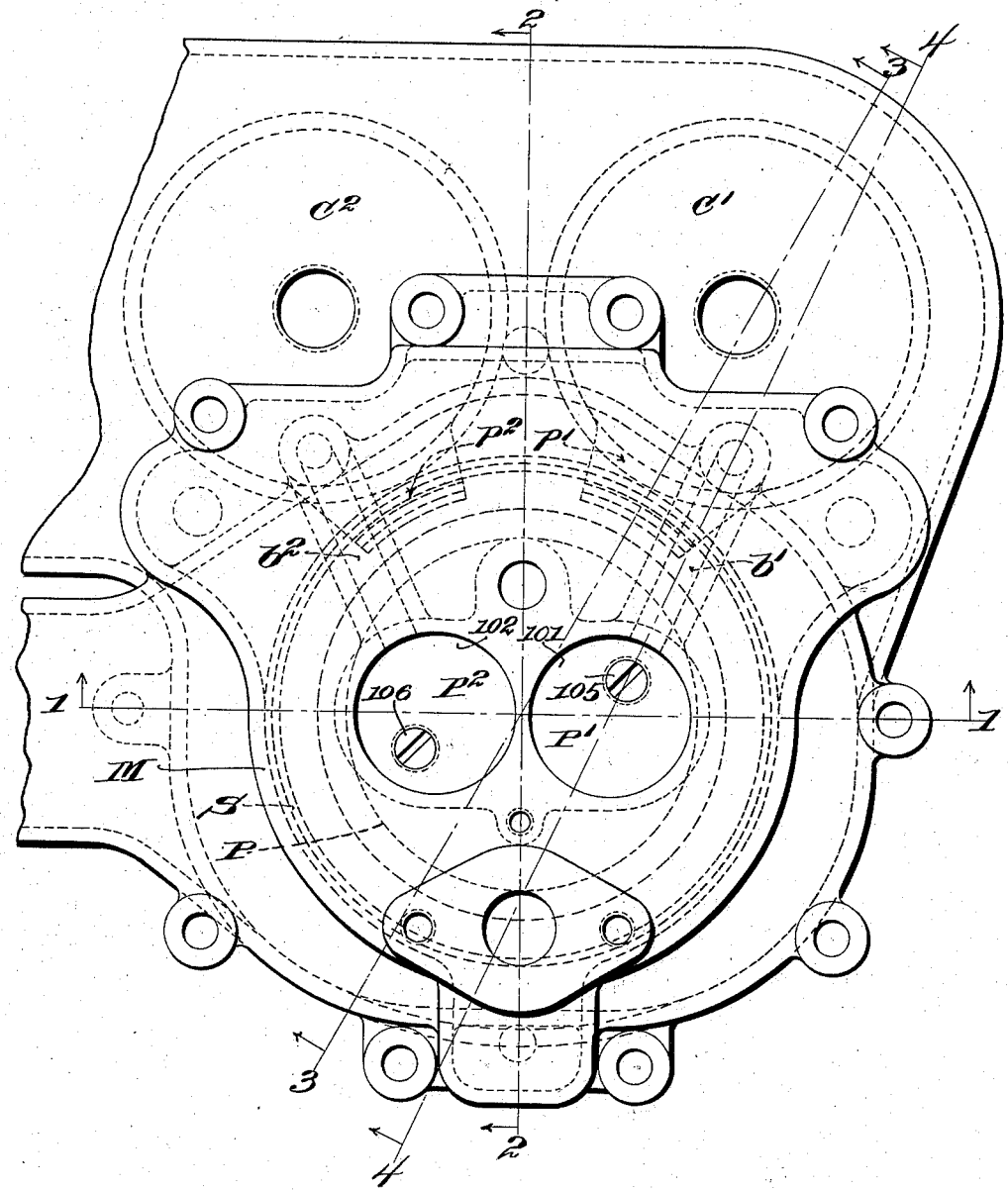
Fig. 1 represents a top plan view of two adjacent cylinders of an internal combustion motor with the rotary valve positioned adjacent thereto for handling the flow of gases to and from the cylinders.
Figure 2:
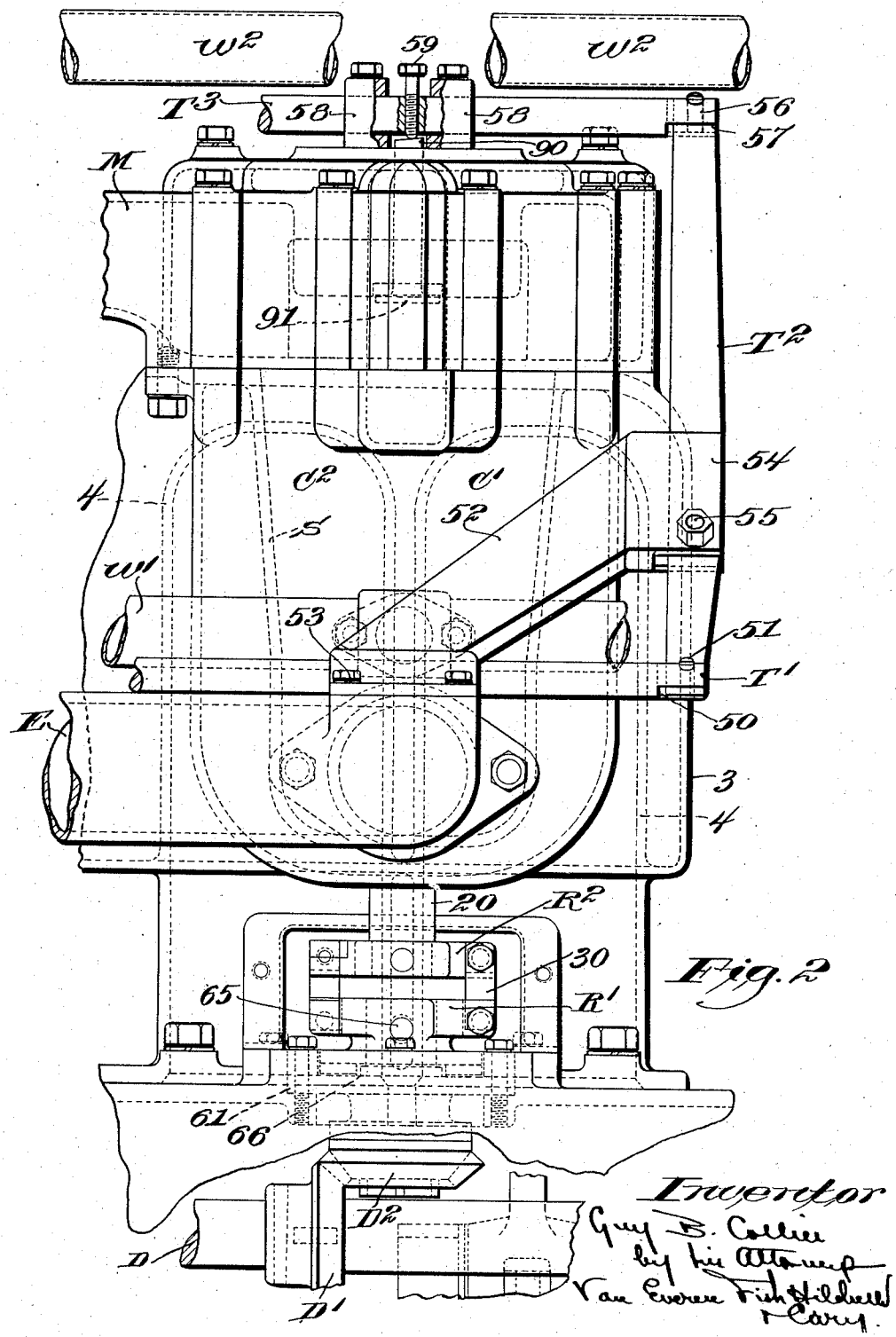
Fig. 2 is a side elevation of the mechanism shown in Fig. 1.
Figure 3:
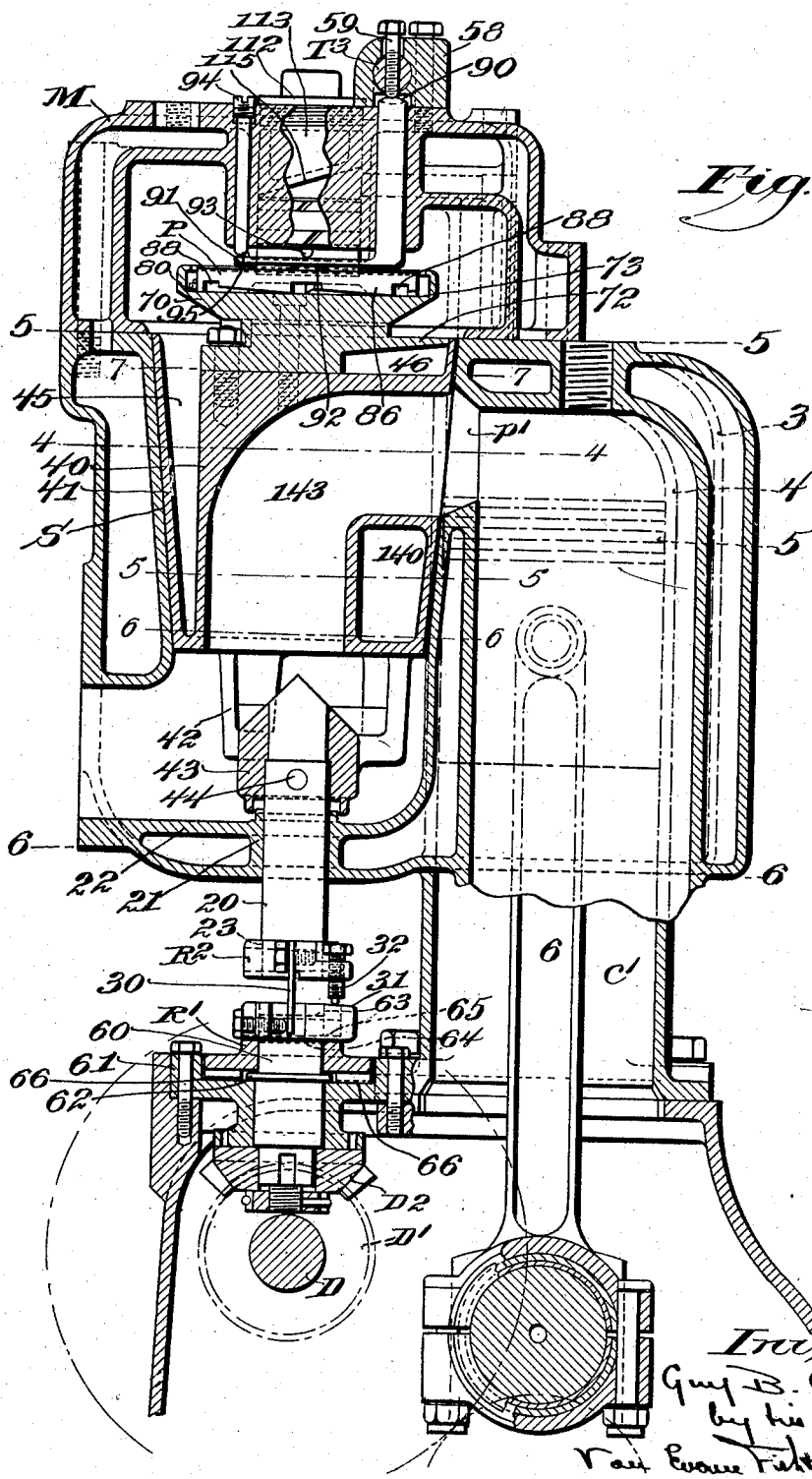
Figure 9:
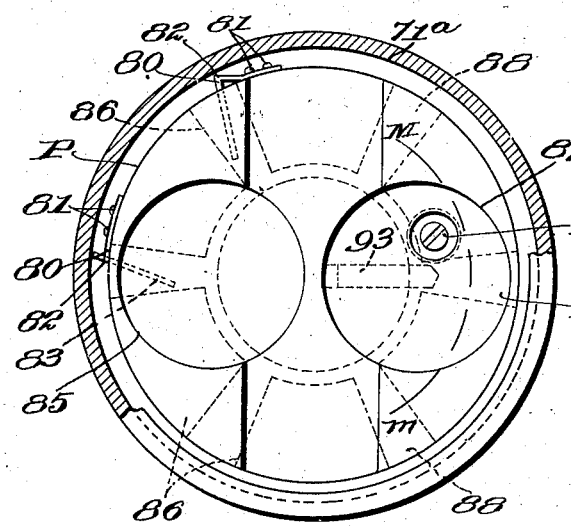
Figures 10, 11:
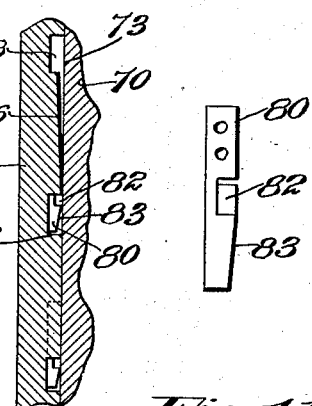
Figure 7:
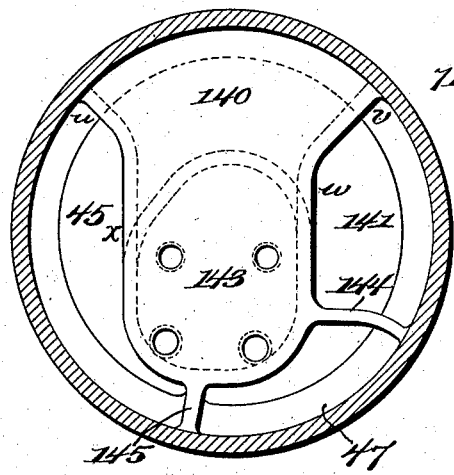
Figure 8:
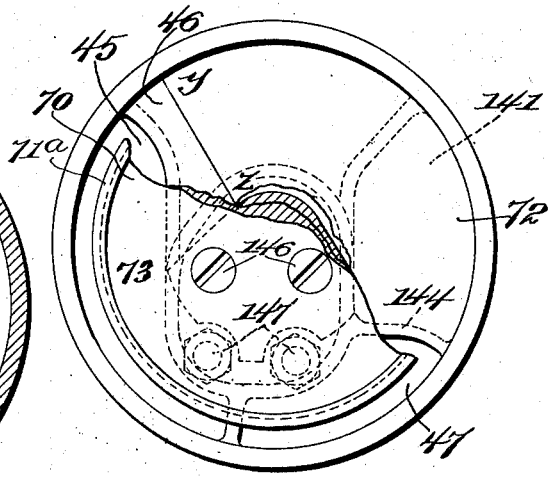

Fig. 3 is a longitudinal section in elevation of the mechanism shown in Figs. 1 and 2 taken on section lines 2—2 and 3—3 of Fig. 1;

Fig. 4 is a section on the line 4—4 of Fig. 3;
Fig. 5 is a section on the line 5—5 of Fig. 3;
Fig. 6 is a section on the line 6—6 of Fig. 3;
Fig. 7 is a section on the line 7—7 of Fig. 3;
Fig. 8 is a detail illustrating a top plan view of portions of the shoe base secured to the top part of the valve;

Fig. 9 is a detail illustrating a plan view of the plug shoe assembly;

Fig. 10 is a detail illustrating a section of the bearing portion of the plug shoe;

Fig. 11 is a detail illustrating one of the oil deflectors;

Fig. 12 is a detail illustrating a longitudinal section on the line 4—4 of Fig. 1; and Fig. 13 is a partial longitudinal section on the line 1—1 of Fig. 1.

Referring to the illustrated embodiment of the invention, Fig. 1 represents a top view of the first pair of cylinders $C^1$ and $C^2$ of a six-cylinder engine, showing also the valve manifold cap M situated partly over the cylinders and partly over the water jacketed valve seat S; $p^1$ and $p^2$ indicate the ports leading to the cylinders $C^1$ and $C^2$ through which the intake and exhaust gases pass, while $P^1$ and $P^2$ denote the balance plug chambers which receive the gas pressure from the cylinders by means of the passages $b^1$ and $b^2$, as a result of which the synchronous balancing of the valve is effected during all except the suction stroke. The pressures in $b^1$ and $b^2$ are transmitted to a plug shoe P, situated just beneath them and resting on top of a member attached to the top of the valve and explained further in detail.

On Fig. 1 the following reference lines 1—1, 2—3, 3—3, 4—4 denote where vertical sections are made and the direction in which the view is to be taken to illustrate and explain certain important features of the gas cooled valve system.

Fig. 2 shows an exterior side elevation of the cylinders $c^1$ and $c^2$, the valve seat S and the intake manifold cap M. In this figure is indicated the valve driving shaft D and the driving gears $D^1$ and $D^2$, of which the latter is connected to the lower member $R^1$ of the release drive, whereas the upper member $R^2$ of the release drive is connected to the valve stem 20, as further illustrated in Fig. 3.

E denotes a part of the exhaust manifold of the engine. $W^2$ indicates the water outlet, while $W^1$ denotes the inlet water passage for supplying the water jackets of the motor.

$T^1$ denotes part of an expansion rod the left end of which is suitably fastened to the left end of exhaust manifold E. Lever T² is connected to the right end of T¹ which is movable by means of a suitable slot 50 and pin 51. This lever T² is fulcrumed in a member 52, suitably fastened, as is indicated at 53, to the exhaust manifold and through the junction at 53 member T¹ passes with a suitably loose fit. Member 52 is bifurcated as indicated at 54 and bolt 55 constitutes the fulcrum. The upper end of T² is pivoted by 56 in a slot 57 provided in the temperature adjustment rod T³. On top of the valve manifold cap is a suitable guide member 58 for each pair of cylinders through which T³ passes, while 59 has an adjustable cap screw, which contacts with the inclined upper surface 90 of the cylindrical stem of the flat plug spring 91.

The foregoing members operate as follows: As the engine warms up to its various working temperatures, the right-hand end of the rod T¹ moves slightly to the right and acting on the lever T² it causes the rod T³ to move slightly to the left, and consequently 59 moving slightly to the left permits 91 a very slight vertical movement, which results in the horizontal part of the flat plug spring 91 rising a very small amount but sufficient to provide for the vertical rise of the valve 40. This rise of the valve 40 is due to the fact that its external shell 41 operates at a higher temperature than the valve seat shell S, and as these are made frusto-conical in shape the valve 40 consequently rises as it warms up to various working temperatures. From this it will be seen that unless the spring 91 is given an opportunity to rise slightly, it will press the valve harder on the seat S when the valve is hot than when the same is cold.

Fig. 3 illustrates the action described for temperature adjustment of the spring 91 with reference to its action on the valve 40 and also brings out the action of the release driving members R¹ and R² in connection with the above-mentioned spring action. The part of Fig. 3 above the line 5—5 is a vertical section taken on the line 2—2 of Fig. 1. The part of Fig. 3 between the line 5—5 and the boundary 6—6 is a vertical section taken on the line 3—3 of Fig. 1. The part of Fig. 3 below the boundary 6—6 is a part vertical section of the lower part of the engine taken on a line 2—2 of Fig. 1. The dot-and-dash outlines of the water jacket wall 3, cylinder wall 4, piston 5 and connecting rod 6, as shown in Fig. 3, indicate these positions in the vertical plane through the line 2—2 of Fig. 1.

At the lower end of valve 40 is a four-arm spider 42, which is part of or is fastened to the bottom part of the valve shell 41 and is shown in plan in Fig. 6. A boss 43 connects with the arms of the spider, and through this passes the valve stem 20 which is securely fastened throughout by a pin 44, a shoulder construction being provided, as indicated, so that it can carry any downward thrust which may be due to the valve. 20 passes through a loose fitting bushing 21 in the bottom part of the valve housing 22. The lower end 23 of stem 20 fits into the member R² of the release drive, which is driven by member R¹ by means of the driving spring 30, while the inclined surface 31 of member R¹ serves to raise the stem 20 and the valve 40 by its contact with the adjustment cap screw 32. If for any reason the valve presses harder on its seat than it normally should, the resistance to rotation will be increased over the normal amount which will cause an increased deflection in the spring 30, thus causing 32 to move slightly up the incline 31 which slightly lifts the valve 40, thus releasing the same and causing it to return to normal working conditions.

A shaft 60 is suitably keyed and otherwise fastened to the gear D² which meshes with driving gear D¹. Member 61 constitutes a thrust and cylindrical bearing member for shaft 60 and for the bottom of gear D², collar 62 and shaft 60 serving to keep this bearing in correct position with reference to member 61. The upper end of shaft 60 has an oblong hole, the top and bottom lines of which are indicated by 63 and 64 and through which pin 65 passes, thus securing member R¹ to shaft 60 so that the two must rotate as one unit, but this permits member R¹ to slightly rise or fall with reference to shaft 60. The bottom part of member R¹ has preferably six thrust pads, shaped so that it will rotate on tapered oil films formed between these pads and the bearing surface 66 of member 61. This results in the surface 66 of member 61 carrying any axial thrust which may come upon the release member R¹ by way of the release member R² in connection with driving the valve, whereby any undue pressure of the valve on its seat will be relieved and whereby power required to rotate the valve will be kept at a low and efficient working value.

Referring to Figs. 1, 2, 3, 4, 5, 7 and 8, the action of the valve is as follows: The incoming mixture from the carbureter for the cylinder is drawn into the manifold cap M and comes to the region surrounding member 70. A large part of the total is drawn down the passage 45. The remainders go into passage 46, which is situated just above the section 7—7, thence into 47 and output 48. This outward flow through 48 from region 47 takes place when 48 is in communication with either $p^1$ or $p^2$.

The downward flow through 45 passes through region 140, as indicated in Figs. 3, 4 and 5, comes up region 141, leaves by a port 142 in the valve shell 41, this flow taking place when port 142 is in communication with either or both of the ports $p^1$ and $p^2$.

The valve section of the valve 40 shown in Fig. 4 rotates counter-clockwise, so that the intake flow for a cylinder first takes place through port 142, the gas reaching it by the following two paths:—down-flow in 45, flow underneath in region 140 and upward flow through the bottom part of 141 to port 142. The second path is flow around through the region 46 and into the upper part of 47 and thence to port opening 48, this path being further illustrated in Fig. 8. This flow is later followed by a flow above the member 72 and around the other side of member 70 to region 47, and thence to port 48 to ports $p^1$ and $p^2$ when 48 is in contact with them.

From the foregoing it is clear that the inner surface of the valve shell 41 is cooled by convection from the flow of the gaseous mixture as the latter contacts with its inner surface, and this mixture also contacts with the exterior surface of the exhaust tube 143, which is almost entirely isolated from the valve shell 41. This tube receives the exhaust gases from a cylinder through port 144 in the valve shell when this port is in communication with either or both of the cylinders. The outlet of 143 is in the bottom wall of the valve and the exhaust gases pass through the open spaces between the legs of the valve spider 42. The incoming gases in contacting with the external walls of the exhaust tube 143 take up heat which serves to effectively vaporize the fuel and thus form a desirable explosive mixture for the cylinder.

The detailed operations of the valve ports with reference to the cylinder port $p^1$ are as follows, see Fig. 4, counter-clockwise rotation valve, the arrangement being shown on the base of the cylinders $C^1$ and $C^2$ functioning 120 degrees apart in the cycle of the engine, while the valve 40 rotates at half engine speed. When the leading edge of the exhaust port $c$ in the valve is at position $i$, the exhaust just starts from cylinder $C^1$ and passes into the tube 143, the opening in the arc increasing with the rotation. When $c$ has reached the opening edge $k$ of the port for cylinder $C^2$, the exhaust now starts from cylinder $C^2$, this being 120 degrees behind the start of cylinder $C^2$, since the arc $k$—$j$ plug $j$—$i$ equals 60 degrees required for valve rotation, which means 120 degrees on engine rotation. The exhaust now passes from cylinders $C^1$ and $C^2$ into tube 143 and continues from both cylinders until $d$ reaches the edge $j$, after which the exhaust continues from cylinder $C^2$ until $d$ reaches edge $i$.

At or about the time that $d$ reaches $j$, $e$ reaches the edge $i$ (depending upon the design arrangement whether the intake opens as the exhaust closes, before it closes or opens a little later), after which $e$ passes $i$. Just as $e$ passes $i$, $C^1$ starts sucking in its explosive mixture. This gas now flows through the manifold cap M, down region 45, through passage 140, up passage 141 and through the valve port 142. Additional gas reaches 142 by flowing through the passage 146 and down through the upper part of region 141 to port 142 into port $p^1$ of cylinder $C^1$. This flow continues only to $C^1$ until $e$ reaches the point $k$. After passing the point $k$, the flow now goes to $C^2$ by way of port $p^2$ while at the same time it flows through $p^1$ to cylinder $C^1$ until $f$ reaches the point $j$, after which the flow through the valve port 142 takes place only to cylinder $C^2$. After the lagging edge of partition 144 of the valve 40 passes edge $i$, flow of the explosive mixture enters $c$ by port 142, as previously explained, for a short interval, and also by port 48 in the valve. The mixture which leaves cylinder $C^1$ by way of port 48 flows through the manifold M and around both sides of member 70 until it reaches region 47. This flow through port 48 to cylinder $C^1$ continues until $h$ reaches $j$.

Partition 144 is necessary in the total intake arc $e$, $f$, $g$, $h$ of valve 40, in order to prevent cylinder $C^2$ from robbing cylinder $C^1$ of a part which had previously been drawn therein. Once $f$ reaches the point $j$ it is impossible for $C^2$ to take anything from $C^1$, as has been proved by actual test.

As the arc $e$—$f$ is greater than $k$—$j$, both $C^2$ and $C^1$ will be drawing gas through port 142 for a short interval after $e$ reaches $k$, that is, before $f$ reaches $j$. During this interval $C^2$ will not draw from $C^1$ since the suction in $C^1$ is stronger than $C^2$, due to the relative positions and speeds of the pistons during this short interval of the valve rotation.

Partition 145 separates regions 45 and 47, and it extends from the bottom part of the valve up to about the level of section 7—7.

From the foregoing it is obvious that the internal surface of shell 41 of the valve is somewhat cooled by the incoming mixtures, while the mixture serves to partially isolate nearly all parts of the walls of tube 143 from transferring the heat to the valve shell 41. The mixture takes heat from the external walls of tube 143, and thereby its fuel becomes sufficiently vaporized, as desired, prior to entering the cylinders. The arrangement shown permits the functioning of cylinder $C^1$ and $C^2$ 120 degrees apart by means of one exhaust port in the valve, together with one intake arc $e$, $f$, $h$ in the valve shell 41, which is divided into two parts 142 and 48 by means of partition 144.

Fig. 6 shows the lower end of the exhaust tube 143 and the bottom wall of the valve bounding passages 45, 140 and 47. It shows the plan of the vertical and horizontal parts of the spider legs 42 indicated in Fig. 3, giving the top view of the spider boss 43 and the upper end of the valve stem 20, which is preferably keyed and pinned to the boss as shown by 43ª and 44.

In Fig. 7 is shown the upper part of region 45 which supplies passage 140, the top part of region 141 and the top part of region 47, and the region 143 indicated beneath the surface of 7—7. Partition 144 extends from the inner bottom surface of the valve to the level of 7—7, while 145 may be a little below or above that level. The surface $u$, $v$, $w$, $x$ in the plane B—$b$ constitute the lower boundary of flow region 46, which supplies gas to the upper part of region 141.

Fig. 8 shows part of the shoe base 70 mentioned in Fig. 3 fastened to the top surface in Fig. 7 by means of suitable screws 146 and bolts 147, which fits on so as to contact with the top of partition 144, thus separating regions 141 from 47. Along the dotted boundary of 144 it rises and then slopes up as indicated by 72 in Fig. 3, extending out to the inner surface of the valve shell 41 and curving around to the line $y$, $z$, which is the other boundary of part 72. Underneath this part 72 and bounded, as is indicated, is the region 46, flow of gas through which takes place to the upper part of region 141, while across the upper surface of 72 flow takes place from the manifold cap M around to the upper part of region 47. It also reaches 47 by flowing around the other side of member 70. The upper surface 73 of the shoe base 70 is finished and constitutes the bearing surface for the plug shoe P, as illustrated in Figs. 3, 8, 9 and 13. The bottom surface of plug shoe P is preferably made with six thrust bearing pads 86, as indicated in the plan view of Fig. 9, the lower surfaces of which pad are slightly sloped as indicated in Figs. 3, 10 and 13, so as to permit the formation of a tapered oil film between the pad surface and the finished surface 73 of the plug shoe 70, which rotates underneath the stationary thrust shoe P, so that in working condition the two surfaces are separated by tapered oil films which carry the thrust load. These thrust pads are separated by regions 88 shown in plan on Fig. 9 and also shown in Figs. 3 and 10. In these regions 88 oil deflectors 80 are situated, which serve to scoop the oil rotating with 70 and divert it under the slightly raised edge of the pads 86. 80 is fastened to the plug shoe P by pins 81 or their suitable equivalent, and the outer part 82 of 80 extends upwards from P so as to deflect the oil which is driven by centrifugal force to the inner surface of the vertical wall 71—A of member 70, and thus force this oil to enter the raised edge of the pads 86.

In Fig. 9 are shown two methods of supporting the outer part 82 of 80 with reference to the fastening by means of 81 to the plug shoe P. The inner part 83 of member 80 is sloped up so as to permit a little oil to pass underneath and thence to the member 86 near its outer radius, while the larger amount passes out near the inner radius of part 83 to enter into pads 86, after which it is again affected by centrifugal force.

Fig. 11 shows further details with reference to member 80 and its assembly on plug shoe P, while Fig. 10 shows additional features on the development taken on the arc M—$m$ of Fig. 9. 85 is a recess in the top of plug shoe P, into which fits the bottom of balance plug 102 belonging to cylinder $C^2$. Balance plug 101 falls to cylinder $C^1$. This plug is shown in top view as placed in its recess 87 of plug shoe P. These plugs when placed in the recesses 85 and 87 hold the shoe P stationary while 70 rotates underneath. The plug shoe P is preferably fastened to the plugs by means of screws 103 and 104, so that it may be lifted up along with the manifold cap and likewise replaced with the same without there being any difficulty of getting the plugs into the recesses 85 and 87 during assembly operations. The preferred arrangement is illustrated in Figs. 9, 12 and 13, the screws 103 and 104 being situated at the bottoms of holes drilled in plugs 101 and 102, the holes being closed by screws 105 and 106 so as to eliminate additional volume in the balance conduits $b^1$ and $b^2$. The plugs 101 and 102 are preferably provided with rings indicated by 111, thus allowing for expansion, and the rings serve to prevent leakage or escape of the gas pressures used in the synchronous balancing past the plugs and into the manifold cap M, which action would be undesirable. The top parts of plug chambers $P^1$ and $P^2$ are closed by suitable caps 112, on the bottom of each of which is a cylindrical member 113 having a slanting bottom 115 secured to 112 by means of two screws 114. The slanting surface 115 of these members serves to deflect the gases from the balance passages downward on to the top surface of the plugs 101 and 102. The construction also serves to reduce the total gaseous volume (which is involved in the pressure balancing) between the top surface of the plug and the top surface of the cylinder, the same being thoroughly illustrated in Fig. 12.

The flat part 91 of the plug spring acts on the curved part 92, which is a part of the plug as illustrated in Figs. 13 and 3, the lower end of each plug near the partition between chambers $P^1$ and $P^2$ being recessed to admit the spring and the lower part being finished in an arc 92 to constitute a bearing from which the downward action of the spring takes place. Just above the spring is a pin 93 fastened in the plug, as indicated in Figs. 13, 9 and 3. This pin 93 in each case serves to transmit the pressure of the plug on to the top surface of the spring. The spring is thus locked between pins 93 and the arcs 92. This prevents any lifting effect that the suction stroke might have on the plugs. It also serves to effect such desired pressure of the plug spring on the plugs and thence downward on to the plug shoe and the member 70 on top of the valve, as may be desired.

In Fig. 3 is shown an adjustment screw 94 whose lower end 95 can be made to contact with the end of the flat plug spring 91. It may serve to secure one of several operating adjustments, depending upon the design details of 91 and the temperature adjustment system previously mentioned.

The mechanism for maintaining the valve in substantial balance during the cycle of operations of the motor and for permitting a limited rising and falling movement of the valve with respect to its seat is fully described and claimed in my Patent No. 1,692,628, dated November 20, 1928, and forms no part of the present invention.

What is claimed is:

1. An internal combustion motor comprising a valve chamber having a port formed therein, a valve rotating in the chamber, an exhaust passage extending upwardly through the central portion of the valve, two separated inlet passages, and a circumferential chamber surrounding the exhaust passage and communicating with the inlet passages.

2. An internal combustion motor comprising adjacent power cylinders each having a port communicating therewith, a rotary valve positioned adjacent the cylinders, an exhaust passage formed in the valve adapted to communicate with the cylinder ports during the rotation of the valve, separated inlet passages communicating with the cylinder ports during the rotation of the valve, and a gas chamber surrounding the exhaust passage and communicating with the inlet passages in a manner to cause the inlet gases to flow about the exhaust passage prior to their introduction into the cylinders.

3. An internal combustion motor comprising adjacent power cylinders, a valve chamber in proximity to the cylinders, a port affording communication between each cylinder and the valve chamber, a conical valve rotating in the chamber, an exhaust passage extending upwardly through the valve and terminating at the level of the cylinder ports to afford communication therewith during the rotation of the valve, separated inlet passages formed in the valve and terminating at the level of the exhaust passage, and a gas cooling chamber communicating with the inlet passages and surrounding the exhaust passages of the valve.

In testimony whereof I have signed my name to this specification.

GUY B. COLLIER.